United States Patent
Jensen

(10) Patent No.: US 8,725,369 B2
(45) Date of Patent: May 13, 2014

(54) METHOD AND SYSTEM FOR DRIVING OF A VEHICLE

(75) Inventor: Anders Jensen, Gnesta (SE)

(73) Assignee: Scania CV AB (SE)

( * ) Notice: Subject to any disclaimer, the term of this patent is extended or adjusted under 35 U.S.C. 154(b) by 0 days.

(21) Appl. No.: 13/515,924

(22) PCT Filed: Dec. 16, 2010

(86) PCT No.: PCT/SE2010/051399
§ 371 (c)(1),
(2), (4) Date: Jun. 14, 2012

(87) PCT Pub. No.: WO2011/075065
PCT Pub. Date: Jun. 23, 2011

(65) Prior Publication Data
US 2012/0253619 A1 Oct. 4, 2012

(30) Foreign Application Priority Data
Dec. 17, 2009 (SE) ........................................ 0950971

(51) Int. Cl.
*B60K 17/06* (2006.01)
(52) U.S. Cl.
USPC ............................................. 701/58; 701/66
(58) Field of Classification Search
CPC ................... F16H 2061/0087; F16H 61/0267; F16H 61/62
USPC ........................................................ 701/58, 66
See application file for complete search history.

(56) References Cited

U.S. PATENT DOCUMENTS

| 5,754,968 A * | 5/1998 | Hedstrom ........................ 701/66 |
| 6,908,412 B2 | 6/2005 | Kurabayashi .................... 477/44 |
| 2008/0183371 A1 | 7/2008 | Wolfgang et al. |
| 2008/0188342 A1* | 8/2008 | Jackson ........................ 475/218 |

FOREIGN PATENT DOCUMENTS

| DE | 10 2008 005 644 A1 | 7/2009 |
| EP | 0 947 738 A1 | 10/1999 |
| EP | 1 031 768 A2 | 8/2000 |

(Continued)

OTHER PUBLICATIONS

International Search Report dated Mar. 24, 2011 issued in corresponding international patent application No. PCT/SE2010/051399.

(Continued)

*Primary Examiner* — Mary Cheung
*Assistant Examiner* — Yuen Wong
(74) *Attorney, Agent, or Firm* — Ostrolenk Faber LLP

(57) ABSTRACT

A method for driving a vehicle which has a gearbox connected to a combustion engine and the gearbox is capable of being set to a number of different transmission ratios in order to deliver motive force to a driveshaft for propulsion of the vehicle. The vehicle is arranged for driving in at least a first mode and a second mode, such that in the first mode the gearbox is switched to a low transmission ratio and in the second mode the combustion engine is disconnected from the at least one driveshaft. When the vehicle is being driven in a situation where there is or will within a specific time be a reduced need for motive force for the vehicle, the method determines whether the vehicle should be driven according to the first mode or the second mode, on the basis of an ambient parameter.

20 Claims, 5 Drawing Sheets

(56) References Cited

FOREIGN PATENT DOCUMENTS

| | | |
|---|---|---|
| JP | S58-42050 | 9/1983 |
| JP | 2003-74682 | 3/2003 |
| JP | 2008-074337 | 4/2008 |
| KR | 1999-0040799 | 6/1999 |
| KR | 10-0494907 | 6/2005 |
| WO | WO 2005/084995 A1 | 9/2005 |
| WO | WO 2009 060241 A1 | 5/2009 |

OTHER PUBLICATIONS

Japanese Office Action, dated Oct. 1, 2013, issued in corresponding Japanese Application No. 2012-544436. English translation. Total 8 pages.

Korean Office Action, dated Aug. 8, 2013, issued in corresponding Korean Patent Application No.10-2012-7018810. Includes English translation. Total 19 pages.

* cited by examiner

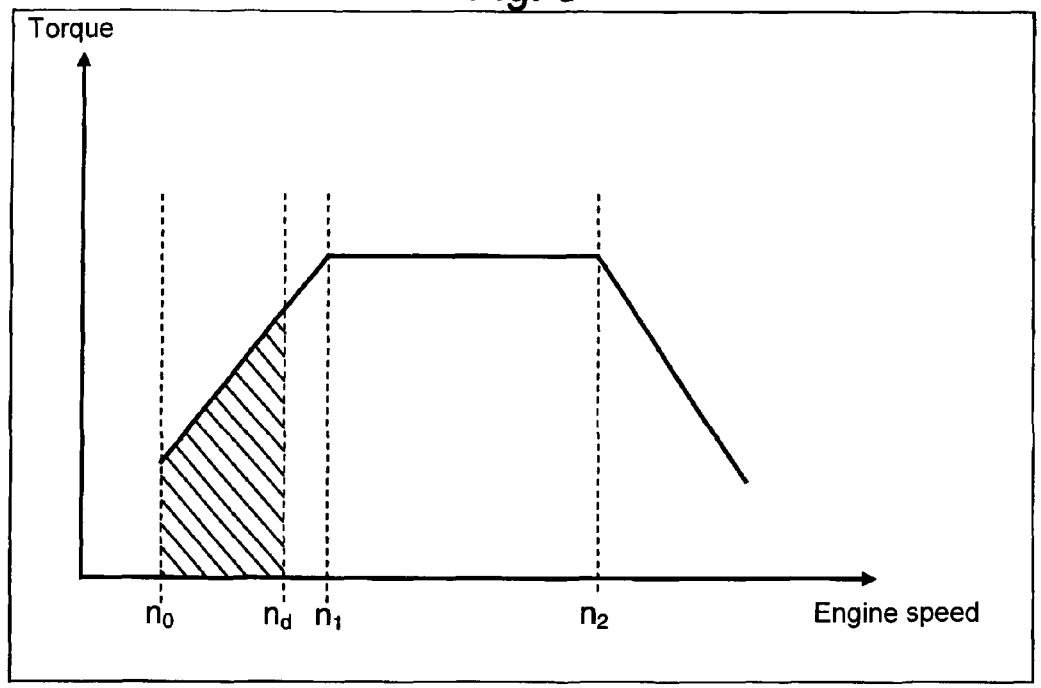
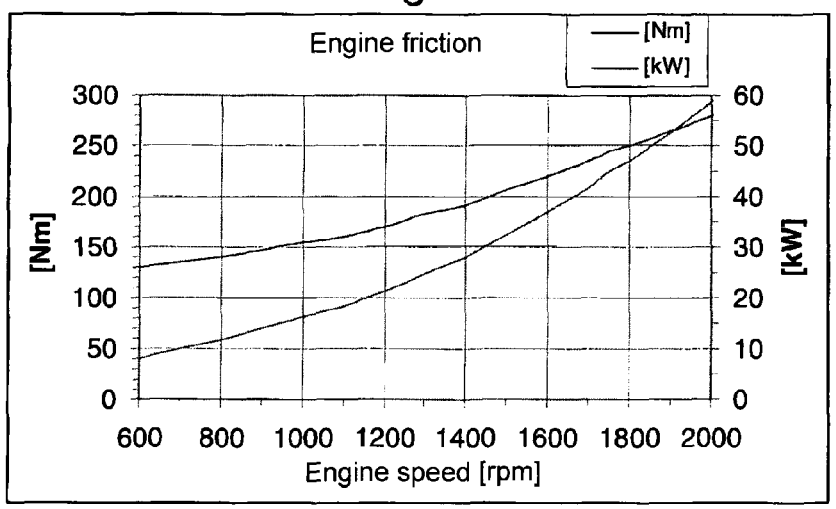

METHOD AND SYSTEM FOR DRIVING OF A VEHICLE

CROSS-REFERENCE TO RELATED APPLICATIONS

The present application is a 35 U.S.C. §§ 371 national phase conversion of PCT/SE2010/051399, filed Dec. 16, 2010, which claims priority of Swedish Application No. 0950971-2, filed Dec. 17, 2009, the contents of which are incorporated by reference herein. The PCT International Application was published in the English language.

FIELD OF THE INVENTION

The present invention relates to a method and a system for driving of a vehicle. In particular, the invention relates to a method and a system for driving of a vehicle in situations where there is or will be a reduced need for power output for driving of said vehicle.

BACKGROUND TO THE INVENTION

In driving of heavy vehicles such as trucks, buses and the like, vehicle economy has over time become an ever greater factor in the profitability of the activity in which the vehicle is used. Apart from its procurement cost, the main costs involved in routine operation of a heavy vehicle normally comprise pay for the driver, repair and maintenance costs, and fuel for propulsion of the vehicle.

Depending on the type of vehicle, the impact of different factors may vary, but fuel consumption is generally a major item of expenditure, and since the capacity utilisation of heavy vehicles is often high, involving a large overall fuel consumption, every possible way of reducing fuel consumption has a positive effect on profitability.

On long-distance runs it is particularly important to optimise fuel consumption. To this end there are long-distance vehicles characterised by a typical engine cruising speed for a certain vehicle cruising speed. Typical vehicle cruising speeds, depending on the region or type of road, may for example be 80 km/h, 85 km/h or 89 km/h.

For heavy vehicles in general, various different power train configurations are available, but since it is often desirable that such vehicles be drivable as comfortably as possible for the driver they are often provided with automatically operated gearboxes such that gear changes are controlled by the control system usually incorporated in the vehicle.

The fact that automatic gear changing in heavy vehicles is usually controlled by the control system makes it possible, a possibility which is often applied, to use a control arrangement whereby the control of the engine and gearbox is conducted partly on the basis of commands from the vehicle driver but also to a large extent by the control system. For this reason the control system often also incorporates functions for improving fuel consumption by as far as possible effecting gear changes and gear choices in as fuel-economising a way as possible.

An example of such a function is a function whereby when the vehicle is on a downgrade its engine is disconnected from its powered wheels when no torque contribution is required to maintain the vehicle's speed. The vehicle's power train is subsequently reconnected when, for example, the driver presses the accelerator pedal or the brake pedal.

Although the aforesaid disconnecting function works well in many cases, there are still situations where the fuel consumption of vehicles powered by a combustion engine can be further reduced.

SUMMARY OF THE INVENTION

An object of the present invention is to propose a method for driving of a vehicle whereby the latter's fuel consumption can be reduced.

The present invention pertains to a method for driving of a vehicle which has a gearbox connected to a combustion engine and capable of being set to a number of different transmission ratios in order to deliver motive force to at least one drive shaft for propulsion of said vehicle. The vehicle is arranged for driving in at least a first mode and a second mode, such that in said first mode the gearbox is switched to a low transmission ratio and in said second mode said engine is disconnected from said at least one driveshaft. The method, when the vehicle is being driven in a situation where there is or will within a specific time be a reduced need for motive force for said vehicle, comprises:

determining whether the vehicle should be driven according to said first mode or said second mode, e.g. on the basis of an ambient parameter for the vehicle's environment. The ambient parameter may be a condition of the vehicle's environment ahead, and said determination may be done by means of one or more control units in the vehicle's control system.

This affords the advantage that the vehicle can be driven, e.g. on downgrades, in the manner which from, for example, a fuel consumption point of view is most effective in the prevailing conditions. For example, it may in certain cases be more advantageous to drive the vehicle with overdrive engaged, whereas in other cases it may be more advantageous to drive it with open power train, i.e. with the engine disconnected from the vehicle's powered wheels.

Said ambient parameter may for example be a representation of the topology of the road ahead of the vehicle and/or the running resistance of the vehicle.

Further characteristics of the present invention and advantages thereof will be indicated by the detailed description of examples of embodiments set out below and the attached drawings.

BRIEF DESCRIPTION OF THE DRAWINGS

FIG. 3 depicts a torque curve for an engine with indicated limits for an overdriven operating range, FIG. 5 depicts engine friction as a function of engine speed in an example of a combustion engine.

DETAILED DESCRIPTION OF EXAMPLES OF EMBODIMENTS

The term overdrive is normally taken to mean a gear in which the output shaft of the gearbox rotates faster than the engine shaft.

In the description and claims set out below, however, the term overdrive is confined to denoting a gear in which the vehicle, at its cruising speed, is driven at an engine speed below that at which the torque plateau for the gear is reached. This means that maximum torque will not be available in such a gear, rendering that gear unusable except in situations where the need for motive force is reduced.

This is exemplified in FIG. 3, which depicts a torque curve with indicated operating range for an overdrive as above. The engine speed $n_d$ denotes the engine speed at which the vehicle's cruising speed or maximum permissible speed is reached, so the engine will never run on the torque plateau of the overdrive (the region between $n_1$ and $n_2$), but always at a lower engine speed and hence lower torque. The overdrive is thus intended to be used at an operating point below the torque plateau for the torque curve, and the operating point $n_d$ can in principle be shifted to any desired appropriate point between $n_0$ (a point where the engine speed is high enough to be able to deliver a positive torque) and $n_1$.

This differs from normally geared vehicles in which the transmission ratios of the gearbox are so arranged that the vehicle is driven at an engine speed which is in the middle of the torque plateau (midway between $n_1$ and $n_2$) or in the upper part of the torque plateau (i.e. nearer to $n_2$) for the highest gear when the vehicle is running at cruising speed. The vehicle's cruising speed may vary depending on regional regulations or type of road but may for example be 80, 85 or 89 km/h.

Driving of vehicles with use of overdrive is also referred to in the parallel Swedish patent application "FÖRFARANDE OCH SYSTEM FÖR FRAMFÖRANDE AV ETT FORDON I" (Swedish Application number 0950973-8, METHOD AND SYSTEM FOR DRIVING OF A. VEHICLE) with the same applicant and filing date as the present application, and also in the parallel Swedish patent application "FÖRFARANDE OCH SYSTEM FÖR FRAMFÖRANDE AV ETT FORDON III" (Swedish Application number 0950976-1; METHOD AND SYSTEM FOR DRIVING OF A VEHICLE) with the same applicant and filing date as the present application.

The torque T and the power output P are related to one another by the equation $$P = T\omega \quad (1)$$

where ω denotes the engine's angular velocity, i.e. 2π60/rpm (where rpm=engine revolutions per minute), which means that the power output P which can be extracted from the engine in the region up to the speed $n_1$ is limited to a lower value than the maximum which the engine can deliver, since both the engine speed and the maximum torque deliverable by the engine are lower. The power output from the engine is thus limited when the overdrive is engaged.

Figure 1A:
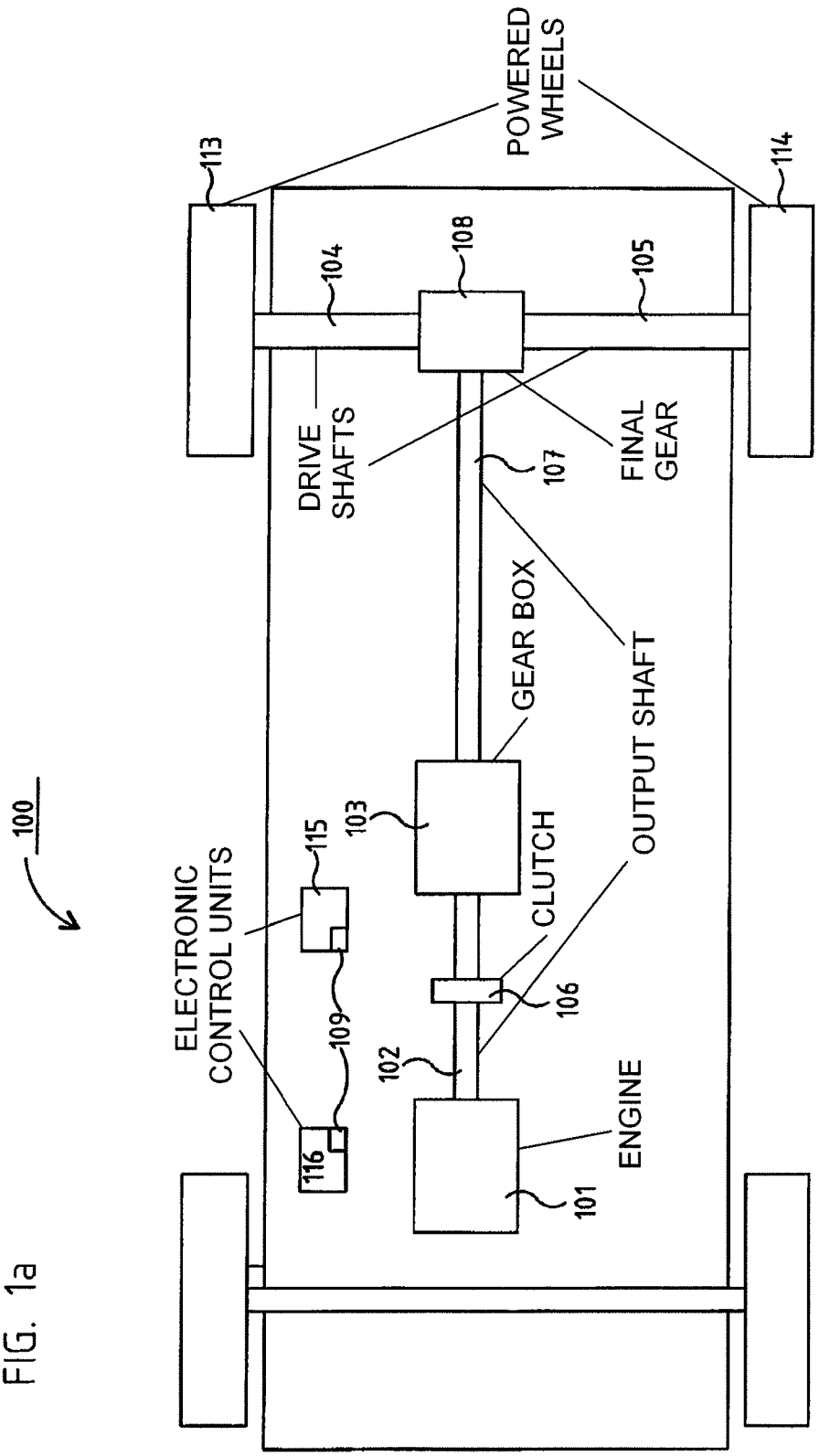
FIG. 1a depicts a power train in a vehicle in which the present invention may with advantage be used.

FIG. 1a depicts an example of a power train in a heavy vehicle 100, e.g. a truck, bus or the like, according to an example of an embodiment of the present invention. The vehicle 100 schematically depicted in FIG. 1a has only one axle with powered wheels 113, 114 but the invention is also applicable in vehicles which have more than one axle provided with powered wheels. The power train comprises a combustion engine 101 connected in a conventional way, via an output shaft 102 of the engine 101, usually via a flywheel (not depicted), to an automatically operated gearbox 103 via a clutch 106.

However, heavy vehicles used largely in agriculture or on motorways are usually provided not with automatic gearboxes in a traditional sense but with "manual" gearboxes in which gear changing is controlled by a control system. This is partly because manual gearboxes are substantially less expensive to manufacture, but also because of their greater efficiency and consequently lower fuel consumption.

The clutch 106 in the embodiment depicted takes the form of an automatically controlled clutch of conventional type, e.g. of disc type. The opening/closing of the clutch is controlled by the vehicle's control system. This is also usual in the case of a manually controlled clutch, such that gear changes after the vehicle has been set in motion take place with closed clutch by appropriate control of the engine during gear changing.

Control systems in modern vehicles usually consist of a communication bus system comprising one or more communication buses for connecting together a number of electronic control units (ECUs), or controllers, and various components located on the vehicle. Such a control system may comprise a large number of control units, and the responsibility for a specific function may be divided between two or more of them. For the sake of simplicity, FIG. 1a depicts only two such electronic control units 115, 116 which respectively control in this embodiment the engine 101 and clutch 106 (in the case with automatically controlled clutch) and the gearbox 103 (two or more from among engine, gearbox and clutch may alternatively be arranged to be controlled by just one control unit). The control of engine, clutch and gearbox by the control units 115, 116 normally depends on signals both from one or the other and also from other control units. Control units of the type depicted are normally adapted to receiving sensor signals from various parts of the vehicle, e.g. from gearbox, engine, clutch and/or other control units or components of the vehicle. The control units are further adapted to delivering control signals to various parts and components of the vehicle, e.g. engine, clutch and gearbox, for their control. The present invention may be implemented in any of the above control units, or in some other suitable control unit in the vehicle's control system.

The control of various parts and components of the vehicle, e.g. choice of gears (transmission ratios), is often governed by programed instructions. These programed instructions take typically the form of a computer program which, when executed in a computer or control unit, causes the computer/control unit to effect desired forms of control action, e.g. method steps according to the present invention. The computer program usually takes the form of computer program products 109 which are stored on a digital storage medium 121 (see FIG. 1b), e.g. ROM (read-only memory), PROM (programable read-only memory), EPROM (erasable PROM), flash memory, EEPROM (electrically erasable PROM), a hard disc unit etc., in combination with or in the control unit, and are executed by the control unit. The vehicle's behavior in a specific situation can thus be adjusted by altering the computer program's instructions.

Figure 1B:
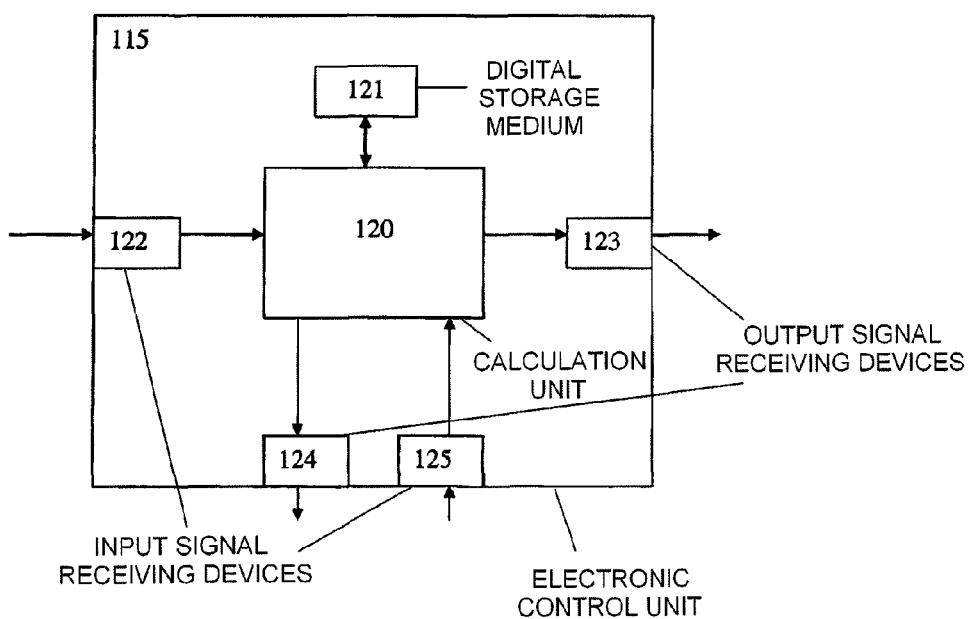
FIG. 1b depicts an example of a control unit in a vehicle control system.

An example of a control unit (the control unit 115) is depicted schematically in FIG. 1b and may comprise a calculation unit 120 which may take the form of substantially any suitable type of processor or microcomputer, e.g. a circuit for digital signal processing (Digital Signal Processor, DSP), or a circuit with a predetermined specific function (Application Specific Integrated Circuit, ASIC). The calculation unit 120 is connected to a memory unit, the digital storage medium 121, which is situated in the control unit 115 and which provides the calculation unit 120 with, for example, the stored program code and/or the stored data which the calculation unit 120 needs in order to be able to perform calculations. The calculation unit 120 is also adapted to storing partial or final results of calculations in the memory unit.

The control unit 115 is further provided with devices 122, 123, 124, 125 for receiving and sending input and output signals. These input and output signals may comprise waveforms, pulses or other attributes which the input signal receiving devices 122, 125 can detect as information and which can be converted to signals processable by the calculation unit 120. The output signal sending devices 123, 124 are adapted to converting signals received from the calculation unit 120 in order, e.g. by modulating them, to create output signals which can be transmitted to other parts of the vehicle's control system and/or the component/components for which they are intended.

Each of the connections to the devices for receiving and sending input and output signals may take the form of one or more from among a cable, a data bus, e.g. a CAN (Controller Area Network) bus, a MOST (Media Orientated Systems Transport) bus or some other bus configuration, or a wireless connection.

The vehicle 100 further comprises drive shafts 104, 105 connected to its powered wheels 113, 114 and driven by an output shaft 107 from the gearbox 103 via a final gear 108, e.g. a conventional differential.

The depicted gearbox 103 in the vehicle 100 is provided with at least one overdrive gear adapted to having an operating range below the torque plateau for that gear at the vehicle's cruising speed as described above. This means, as described above, that the vehicle normally cannot be driven with such a type of overdrive engaged, since the engine's speed at the operating point will usually be too low to be able to deliver enough torque. In addition, as soon as the need for motive force increases, the engine will drop to a lower speed at which still less power is available and there is risk of the engine stopping.

The object of such an overdrive is instead to minimise parasitic losses, and hence fuel consumption, in operating conditions where there is a reduced or no need for power output.

An alternative way of reducing fuel consumption in certain situations takes the form, as above, of a function whereby the engine is disconnected from the vehicle's powered wheels, e.g. by opening the clutch or placing the gearbox in a neutral position, when the vehicle is on a downhill run where no torque contribution is required from the engine to maintain or substantially maintain the vehicle's speed.

The present invention utilises the potential of both of these ways of reducing fuel consumption, by in a first mode driving the vehicle with overdrive engaged or in a second mode driving the vehicle with engine disconnected.

Figure 2:
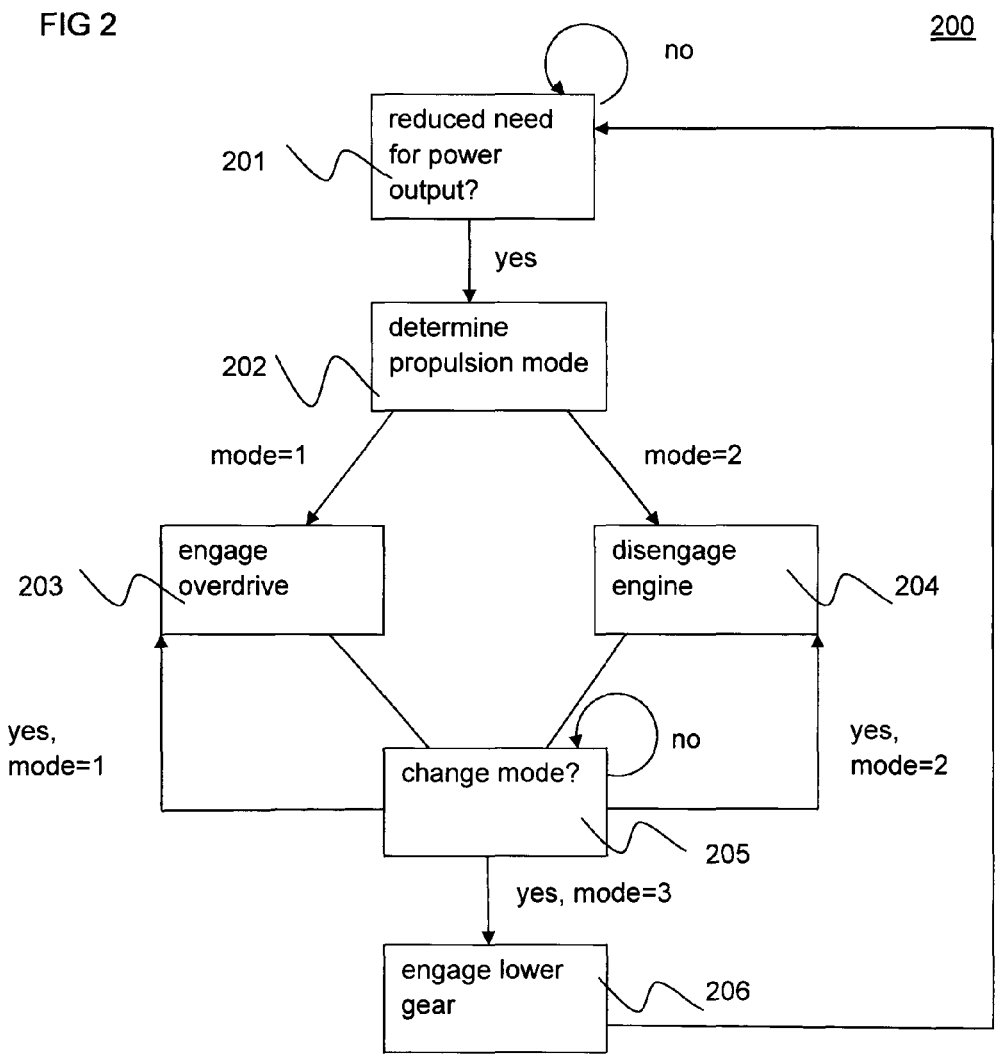
FIG. 2 is a flowchart illustrating an example of a method for control of the driving of a vehicle according to an example of an embodiment of the present invention.

An example of an embodiment of a method for driving of a vehicle according to the present invention is illustrated in FIG. 2.

Step 201 determines whether there is a reduced need for power output. A low need for power output may typically be determined if the power output needed to propel the vehicle at its speed at the time is lower than a threshold value.

If the vehicle is for example being driven on a downgrade, the power output needed to propel it is reduced because the earth's power of attraction by gravity on downgrades (as opposed to upgrades) contributes a positive (forward) motive force component such that the need for power output from the engine to propel the vehicle may decrease markedly or even cease altogether, so disconnecting the engine from the powered wheels, i.e. breaking the power train by, for example, placing the gearbox in a neutral position or opening the clutch, may result in the vehicle, assisted by the force of gravity on the downgrade, maintaining desired speed or even gaining speed. Alternatively, a need for power output may continue but at a reduced level relative to the engine's maximum output, such that the reduced output (the available torque) extractable by using the overdrive is sufficient to be able to drive the vehicle at unchanged or substantially unchanged speed despite the low engine speed involved as described above.

If it is determined that there is or soon will be a reduced or no need for motive force, which may be done in various different ways as exemplified below, the process moves on to step 202 where an appropriate mode for driving of the vehicle is determined.

Step 202 thus does a determination as to whether from a fuel consumption or some other point of view it is more advantageous to switch the gearbox to the overdrive (mode 1) or to disconnect the engine from the vehicle's (one or more) drive shafts (break the power train) (mode 2) in order to reduce the vehicle's rolling resistance by not applying engine brake torque, or whether normally the engine speed should be maintained for some other purpose.

Switching to the overdrive affords the advantage of reducing the engine's need for fuel, thereby achieving a fuel saving, while at the same time the engine speed goes down to a very low value and the level of noise from the engine drops.

Depending on, for example, the road gradient at the time and the vehicle speed at the time, there may be different degrees of advantage in engaging overdrive or disconnecting the engine.

The mode determination is done by use of an ambient parameter which represents a condition of the vehicle's environment, e.g. the vehicle's running resistance or the topology of the road ahead of the vehicle, and it may for example be done by determining (calculating) the highest speed which the vehicle will reach in each mode.

Figure 4:
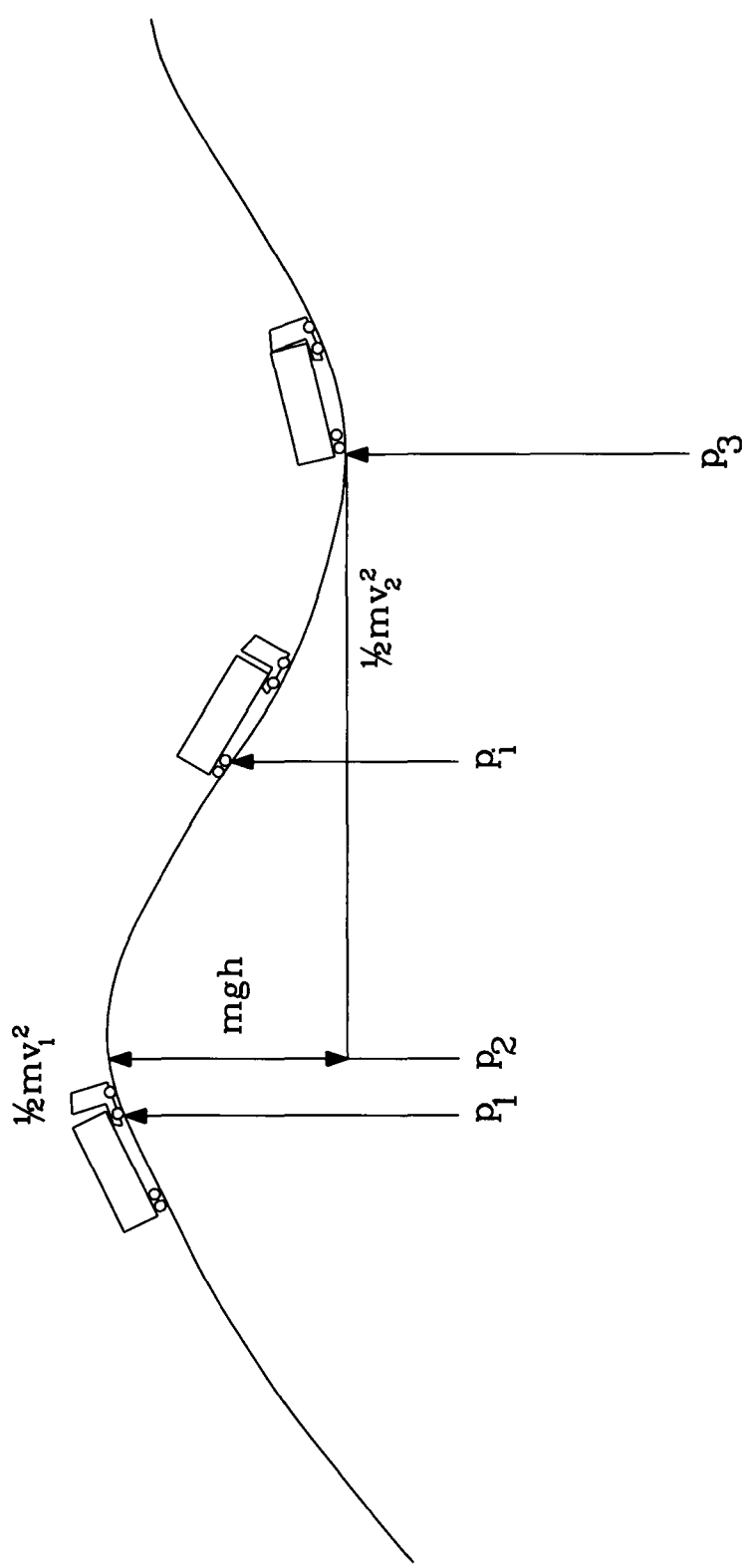
FIG. 4 illustrates driving of a vehicle along an example of a section of road.

FIG. 4 illustrates an example of a vehicle travelling along a hilly stretch of road. At location $p_1$ the vehicle 400 is at the end of an upgrade and approaching a hillcrest. The determination according to step 202, depending on how it is done, may either take place already at point $p_1$ or at point $p_2$ or after the vehicle has passed the crest.

A first example of an embodiment uses a look-ahead (LA) function in the determination at step 202 of a strategy for how best to address the downgrade from, for example, a fuel consumption point of view.

The LA function may for example comprise a road gradient database provided in the vehicle, either for all the roads within a geographical area, e.g. a region, a country, a continent etc., or for the road sections along which the vehicle is normally driven. Combining these data with the vehicle's location, which may for example be obtained via a GPS receiver, makes it possible for the vehicle's control system to be aware of the nature of the road ahead of the vehicle and then use these data in various ways, e.g. for cruise control functions. Alternatively, instead of being stored in a database in the vehicle, road gradient data may be arranged to be sent continuously or at certain intervals to the vehicle via any suitable wireless link, such that data transmitted may for example be controlled by the vehicle's location at the time. In addition to topographical information, road data may also comprise information about speed limits, road bends etc. These data may also be used in the determination according to the present invention, e.g. so that there is no risk of speed limits being exceeded or of the vehicle entering a bend at undesirably high speed.

This LA function is often already implemented in today's vehicles, and data from it can be sent to the control unit 115 and/or 116 for use in determination of coming motive force needs and/or energy losses.

The first example of an embodiment of the present invention uses these data about the road ahead of the vehicle in conjunction with vehicle data to determine at step 201 that there is a reduced need for motive force, and to calculate the vehicle speed on downhill runs where there is a reduced or no need for motive force, so that this speed is then used for choice of appropriate gear change strategy.

Thus on the basis of data from said LA function, the control unit 115 and/or 116 can already determine, at point $p_1$ where there is a relatively large need for motive force, that a reduced need for motive force will soon arise, and it can also relatively accurately calculate the highest speed which the vehicle will reach, on the basis of knowing its speed at the time, the gradient of the coming downgrade and the vehicle's aggregate energy losses on the coming downgrade.

Thus the overdrive can be engaged or the engine be disconnected at an optimum point in time without need for detection of engine signals in order to determine that there is a low need for power output.

For example, there may be deemed to be a low need for power output if it is lower than a certain threshold value, which may for example be a proportion, e.g. 10-15%, of maximum power output.

The determination may for example be based on energy considerations. The potential energy change between the hillcrest $p_2$ and a point on the downgrade, e.g. its lowest point $p_3$, or any other point on the downgrade, e.g. point $p_1$, or the point where vehicle speed is greatest (which may for example be point $p_3$), may be written as E=mgh, where h denotes the difference in altitude between $p_2$ and a chosen point (in this case $p_3$), and m the weight of the vehicle. It is generally the case that the work (the energy) converted when a body moves over a distance s may be written as $W=\int_0^s Fds$, where F is the force acting upon the body over that distance. Since according to the laws of physics no energy is ever lost, the decrease in potential energy between a higher point (e.g. $p_2$ in FIG. 4) and the lower point (e.g. $p_3$) will be matched by a corresponding difference in kinetic energy at the two points and the work performed in travelling between those points.

Thus this potential energy may be rewritten in the following form (it should be noted that this equation is simplified and that the vehicle may in reality be affected by more factors which need to be taken into account in situations where they are relevant):

$$mgh = \left(\frac{1}{2}mv_2^2 - \frac{1}{2}mv_1^2\right) + \int_0^s (F_{air} + F_{rr} + F_{eng} + F_{gb} + F_{axle/nav} + F_1)ds \quad (2)$$

where:
the limits of the integral are defined by 0, which represents the point where the calculation is done, and s represents the distance which the vehicle will travel before the chosen point is reached, $v_1$ denotes the vehicle's speed at the hillcrest $p_2$, $v_2$ denotes the vehicle's speed at the low point $p_3$, $F_{air}$ denotes the vehicle's air resistance and may be calculated by its control system according to equations which are well described in prior art, on the basis inter alia of the vehicle's speed and cross-sectional area in its direction of movement, $F_{rr}$ denotes the vehicle's rolling resistance, which is likewise calculated according to known equations on the basis of vehicle weight, rolling resistance coefficient and road gradient, $F_{eng}$ denotes the motive force applied to the vehicle's powered wheels by its engine. In the above equation this motive force is described as a braking force, which is correct in the case of a trailing engine which applies the forward motive force negatively by the engine's friction. In the case of a pushing (positive) motive force, the sign in the equation changes, and $F_{eng}=0$ in the case of disconnected engine (mode 2 as above), $F_{gb}$ denotes the friction of the gearbox, which may be estimated by the vehicle's control system on the basis of knowing the gear position and the temperature of the gearbox (higher temperature usually means lower friction), $F_{axle/nav}$ denotes friction in rear axle/seals/wheel bearings and may be speed-dependent and be stored in the control system, $F_1$ denotes other forces which need to be taken into account in certain cases where they are relevant, e.g. engine-loading ancillaries such as AC compressor, generator, air compressor and power steering. It may also be relevant to take into account brake power and/or moment of inertia. In other cases this factor may be estimated at zero, and s denotes the distance travelled by the vehicle, in this case the distance from point $p_2$ to point $p_3$.

Equation (2) above and knowledge of the nature of the road ahead of the vehicle can thus be used to determine the most appropriate strategy to be adopted on the downgrade from a fuel consumption point of view. How advantageous different strategies may be in different situations will depend on, for example, how steep the downgrade is and the nature of the road after the downgrade.

In the example depicted in FIG. 4, the vehicle's expected speed at point $p_3$ or some other point on the downgrade may thus be estimated at point $p_1$, e.g. for travelling on the downgrade on overdrive (both for trailing engine and for pushing engine) or with the engine disconnected from the powered wheels, and also for different gearchange times (i.e. whether disconnection/engagement of overdrive should take place before, at or after the hillcrest $p_2$) in order best to optimise the vehicle's propulsion, e.g. from a fuel consumption point of view.

For example, changing to overdrive/disconnection of engine may be arranged to take place already before the vehicle reaches the hillcrest, e.g. if it is already possible to decide beforehand that the vehicle would otherwise accelerate to maximum permissible speed on the coming downgrade.

Similarly, downward gearchanging may take place before the need for power output actually arises if it is determined that the vehicle is approaching an upgrade.

It is also possible to estimate the vehicle's speed on a subsequent upgrade, in which case the determination of gearchange strategy may take into account the possibility that the vehicle may accelerate on the downgrade to a speed such that a short subsequent upgrade which is itself followed by a further downgrade can be coped with out provision of unnecessary motive force.

If for example it is found that the vehicle's running resistance is negative, i.e. that the downgrade is such that disconnecting the engine from the vehicle's powered wheels will result in a speed increase which makes it necessary for the vehicle to be braked before it reaches point $p_3$, it is better that the overdrive be engaged with the power train closed, in order thereby to increase the running resistance by use of engine friction. In this situation no energy is delivered from the engine, which is instead "trailed", with fuel injection switched off and consequently no fuel consumption.

The engine friction depends at least partly on friction in bearings and sliding surfaces and on energy consumed in pumping air, oil and water through the engine. FIG. 5 illustrates engine friction as a function of engine speed in an example of a combustion engine.

As may be seen in the diagram, the braking torque applied by the engine is almost twice as great at around 1800 rpm (250 Nm) as at 600 rpm (130 Nm). Since the engine's power output depends on both its torque and its speed, the difference in brake power output will be still greater (47 kW as against 8 kW). Trailing the engine at various engine speeds thus it makes it possible for the vehicle to be driven without fuel consumption with various brake resistances.

Trailing the engine at low engine speed, i.e. with overdrive engaged, thus affords the advantage that the braking torque which the engine applies to the drive shafts when the power train is closed will be far less than when trailing at higher speeds as above, which may in many cases make it possible for the engine to be trailed while at the same time the speed of the vehicle is maintained or at least does not decrease by more than, for example, a certain value, with no fuel consumption during trailing.

In contrast, if it is determined that the vehicle will not need braking on the downgrade, it may be preferable for the engine to be disconnected altogether from the drive shafts, i.e. for the power train to be broken, in which case no braking torque from the engine is applied at all, with the disadvantage that fuel is consumed all the time to keep the engine running, but the advantage that the vehicle stores up more kinetic energy before, for example, an immediately subsequent upgrade.

Alternatively, it may be advantageous to run on overdrive at as high a power output as possible in order to store up the greatest possible amount of energy before a subsequent upgrade, e.g. after point $p_3$ in FIG. 4.

The downgrade may also be such as to result in a reduced need for power output but not be steep enough to enable the vehicle to accelerate/maintain speed purely by gravity, in which case a certain contribution is required from the engine, e.g. 10-50 kW, for the vehicle speed to be maintained or substantially maintained, but the required contribution is still small enough to be deliverable when running on overdrive.

How much power output can be delivered by the engine with overdrive engaged depends on where in the region between $n_0$ and $n_1$ the operating point $n_d$ is, since the torque (and hence the power output as above) varies greatly with engine speed within the operating range at the time, see FIG. 3.

The determination of appropriate modes for driving of the vehicle may also be controlled by the nature of the road after the downgrade. If the downgrade is followed by, for example, a long straight stretch, it may be advantageous to roll with the power train open for as long as possible before positive torque is again required to propel the vehicle and the power train is therefore closed again.

According to the present invention it is thus possible to do a determination of appropriate strategy for how best the vehicle should be driven on the downgrade.

If step 202 determines that overdrive should be engaged, the process moves on to step 203, in which the overdrive is also engaged either for trailing or engine braking or for generating a pushing torque.

In other cases the process moves on to step 204 for opening of the power train.

The present invention may also be used to combine strategies during the downgrade, e.g. the vehicle may be driven on the first part of the downgrade, e.g. up to point $p_i$ in FIG. 4, with overdrive engaged, but at point $p_i$ the engine is disconnected specifically to make it possible for the vehicle to accelerate under its own momentum to a maximum speed allowed (by the control system) so that at point $p_3$ it is in the best possible state to be driven most economically on the subsequent upgrade. The process according to FIG. 2 therefore moves on from step 203 or 204, as the case may be, to step 205 which establishes whether a mode change should take place.

It may already be determined at step 202 that a mode change according to step 205 should take place at a certain location or after a certain time, but the change may also be controlled by other factors. For example, mode change may be arranged to take place if for example it is determined that the vehicle's speed at the time deviates from a speed reference $H_{ref}$ by a threshold value $H_{thres}$. $H_{thres}$ may for example be a percentage, e.g. 1, 2 or 5%, of the reference $H_{ref}$, or be absolute, i.e. irrespective of whether the speed difference is an increase or a decrease, or it may for example be only a decrease. So long as the vehicle's speed does not differ from the speed reference $H_{ref}$ by more than said difference, the process remains at step 205.

In contrast, if the speed difference deviates from the threshold value $H_{thres}$ a mode change takes place. If the vehicle speed is lower than the reference value, i.e. deviates downwards by more than the threshold value $H_{thres}$, the process may comprise a determination of whether more power output can be extracted from the engine with overdrive still engaged. If such is the case, the power output increases.

If however no further power output is available with overdrive engaged or if for some other reason a downward gear change is required, the process moves on to step 206, where according to a third mode the gearbox is changed down to a lower gear (a higher transmission ratio) to make more power output available and thereby make it possible to accelerate the vehicle to a higher speed and/or generate a higher motive force on a coming upgrade.

In an alternative embodiment, the process may also comprise the possibility of choosing, from step 203, to switch the gearbox to a higher transmission ratio according to mode 3, there thus being three alternatives to be taken into account when determining appropriate strategies for the driving of the vehicle.

The invention is described above in relation to an LA function. In an alternative embodiment, the ambient parameter determined is instead the running resistance at the time, which is used to determine that there is a low need for power output. The running resistance may be calculated by $F_{air}+F_{rr}+F_{eng}+F_{gb}+F_{axle/ave}+F_1$ in equation (2) above. In this case the speed which the vehicle will reach on the downgrade cannot be calculated, since the length of the downgrade is not known. Instead it is possible, for example, for a first choice to be made on the basis of the running resistance, followed by continuous calculation of the running resistance (and/or determination of the vehicle's speed) in order where necessary to change on the downgrade the mode for driving of the vehicle.

Said ambient parameter may also comprise headwind or tailwind (which may be calculated by using a wind gauge mounted on the vehicle or geographical wind data transmitted to the vehicle, e.g. via a wireless link) or precipitation (which may for example be determined by rain sensor or windscreen wiper usage), in which case major precipitation may make it desirable that the vehicle should reach only a lower maximum speed on the downgrade.

In determining the need for motive force it is also possible to use a method and a system for arriving at a parameter which comprises and takes into account a vehicle's running situation when determining its motive force capacity. Determination of such parameters is described in detail in the parallel Swedish patent application "METOD FÖR BESTÄMNING AV DRIVKRAFTKAPACITET HOS ETT MOTORFORDON" (Swedish Application number 0950970-4, METHOD AND SYSTEM FOR DRIVING OF A VEHICLE) with the same applicant and filing date as the present application.

The process depicted in FIG. 2 may also be dependent on a superordinate process which monitors continuously whether there is any other reason for an increased need for power output from the engine. For example, changing down to a lower gear (a higher transmission ratio), mode 3, may for example be arranged to take place always when, for example, any of the following criteria is fulfilled: vehicle speed increasing to a level set for a cruise control function, driver moving the accelerator pedal or the brake pedal, vehicle accelerating past a set speed. The process may than go back to step 201 for a new determination of the need for motive force.

The present invention is described above in relation to a conventional gearbox. However, the invention is also applicable in the case of other types of gearbox, e.g. CVT (Continuous Variable Transmission) gearboxes, so long as the CVT gearbox can be set to a transmission ratio in which the vehicle at cruising speed runs at an engine speed which is below the lowest speed for the torque plateau of that ratio.

Mode change as above may also be arranged to be controlled by other factors. Vehicles of the above type usually have an exhaust cleaning system to reduce emissions from the engine. However, these exhaust cleaning systems usually require a certain lowest temperature, e.g. 200° C., for them to function as desired. Nor will an engine which is trailed, i.e. not supplied with fuel, deliver warm exhaust gases to maintain the temperature in the exhaust cleaning system. On the contrary, air will be pumped all the time through the engine, and this relatively cold air will cool the exhaust cleaning system.

Although trailing on overdrive as above results in less cold air passing through the engine, and in the cooling therefore being slower, it may still happen, e.g. on a long downhill run, that the temperature of the exhaust cleaning system drops to an undesirably low level and therefore needs raising. This temperature rise can for example be achieved by generating a pushing torque when running on overdrive according to the present invention, since lower gear means cooler exhaust gases than when using overdrive. Thus the exhaust cleaning system's temperature and need for warming may also affect appropriate mode choice.

The invention claimed is:

1. A method for driving a vehicle, wherein the vehicle comprises a combustion engine, a gearbox connected to the combustion engine and at least one driveshaft connected to the gearbox for propulsion of the vehicle, the vehicle and the gearbox being configured and operable for driving the vehicle in at least a first mode or a second mode, the gearbox being set to different transmission ratios to deliver motive force to the at least one driveshaft, comprising:
determining that there is or will within a predetermined time be a reduced need for motive force for the vehicle; and
determining whether the vehicle should be driven according to the first mode or the second mode,
wherein in the first mode the gearbox is switched to a low transmission ratio and in the second mode the combustion engine is disconnected from the at least one driveshaft so that in the second mode no combustion engine torque is applied to the at least one driveshaft.

2. A method according to claim 1, wherein determining whether the vehicle should be driven according to the first mode or the second mode is performed on the basis of an ambient parameter.

3. A method according to claim 2, wherein the ambient parameter is based on the vehicle's environment.

4. A method according to claim 3, wherein the ambient parameter is a condition of the vehicle's environment ahead of the vehicle.

5. A method according to claim 2, wherein the ambient parameter is used to determine a speed of the vehicle for a location of the vehicle at a time subsequent to a time at which the speed of the vehicle is determined, and the step of determining whether the vehicle should be driven according to the first mode or the second mode is performed based on the speed determined.

6. A method according to claim 2, wherein the ambient parameter is used to determine a highest speed which the vehicle will reach during driving according to the first mode and/or the second mode, and the step of determining whether the vehicle should be driven according to the first mode or the second mode is performed based on the highest speed determined.

7. A method according to claim 1, wherein determining whether the vehicle should be driven according to the first mode or the second mode is done by at least a control unit which forms part of a control system of the vehicle.

8. A method according to claim 1, wherein determining whether the vehicle should be driven according to the first mode or the second mode is performed based on a parameter value which represents a need for motive force for driving the vehicle at a location at a time subsequent to a time at which the step of determining whether the vehicle should be driven according to the first or the second mode is performed.

9. A method according to claim 8, wherein,
if the parameter value which represents the need for motive force fulfills a first criterion, then the gearbox is switched to the low transmission ratio according to the first mode, and
if the parameter value which represents the need for motive force fulfills a second criterion, then the combustion engine is disconnected from the at least one driveshaft according to the second mode.

10. A method according to claim 1, wherein in the low transmission ratio, the combustion engine runs at an engine speed below a torque plateau for the low transmission ratio.

11. A method according to claim 1, wherein determining that there is or will within a predetermined time be a reduced need for motive force to propel the vehicle is performed by using data concerning a gradient of a road ahead of the vehicle and/or by using data concerning a topography of a road ahead of the vehicle and/or a running resistance of the vehicle.

12. A method according to claim 1, wherein determining that there is or will within a predetermined time be a reduced need for motive force to propel the vehicle is performed by using control signals to and/from the engine.

13. A method according to claim 1, further comprising, during driving according to the first mode or the second mode, switching the gearbox to a higher transmission ratio than the low transmission ratio when a speed of the vehicle and/or an ambient parameter fulfills a third criterion, and the method also comprises, during driving in the second mode, closing the power train.

14. A method according to claim 1, further comprising, during driving according to the first mode or the second mode, switching the gearbox to a higher transmission ratio than the low transmission ratio when a speed of the vehicle deviates from a first speed by a first speed deviation, and the method also comprises, during driving in the second mode, closing the power train.

15. A method according to claim 1, further comprising, during driving in the first mode or the second mode, continuously monitoring whether there is and/or will within a predetermined time be a need for power output from the engine and, if there is and/or will be such a need, switching the gearbox to a higher transmission ratio than the low transmission ratio, and the method also comprises, during driving in the second mode, closing the power train.

16. A method according to claim 1, wherein the gearbox comprises a number of distinct gears, and the method further comprises switching the gearbox to a lower/higher transmission ratio which comprises changing the gearbox to a higher/lower gear.

17. A method according to claim 1, wherein the vehicle and the gearbox are also configured to driving the vehicle in a third mode in which the gearbox is switched to a higher transmission ratio than the low transmission ratio, and the method further comprises determining whether the vehicle should be driven according to the first mode, the second mode or the third mode based on an ambient parameter.

18. A non-transitory computer-readable medium containing computer instructions stored therein for causing a computer processor to apply a method for driving a vehicle, wherein the vehicle comprises a combustion engine, a gearbox connected to the combustion engine and at least one driveshaft connected to the gearbox for propulsion of the vehicle, the vehicle and the gearbox being configured and operable for driving the vehicle in at least a first mode or a second mode, the gearbox being set to different transmission ratios to deliver motive force to the at least one driveshaft, the method comprising:
   determining that there is or will within a predetermined time be a reduced need for motive force for the vehicle; and
   determining whether the vehicle should be driven according to the first mode or the second mode;
   wherein in the first mode the gearbox is switched to a low transmission ratio and in the second mode the combustion engine is disconnected from the at least one driveshaft so that in the second mode no combustion engine torque is applied to the at least one driveshaft.

19. A system for driving a vehicle comprising a combustion engine, a gearbox connected to the combustion engine and at least one driveshaft connected to the gearbox for propulsion of the vehicle, the gearbox being set to different transmission ratios to deliver motive force to the at least one driveshaft, the vehicle and the gearbox being arranged for driving the vehicle in at least a first mode and a second mode, such that in the first mode the gearbox is switched to a low transmission ratio and in the second mode the combustion engine is disconnected from the at least one driveshaft so that in the second mode no combustion engine torque is applied to the at least one driveshaft;
   the system comprising a device configured to determine whether the vehicle should be driven according to the first mode or the second mode, based on an ambient parameter;
   the device being operative to determine whether the vehicle should be driven according to the first mode or the second mode when the vehicle is being driven in a situation where there is or will within a predetermined time be a reduced need for motive force for the vehicle.

20. A vehicle comprising:
   a combustion engine;
   a gearbox connected to the combustion engine; and
   at least one driveshaft connected to the gearbox for propulsion of the vehicle,
   wherein the gearbox is set to different transmission ratios to deliver motive force to the at least one driveshaft, and
   the vehicle and the gearbox are arranged for driving the vehicle in at least a first mode and a second mode, such that in the first mode the gearbox is switched to a low transmission ratio and in the second mode the combustion engine is disconnected from the at least one driveshaft so that in the second mode no combustion engine torque is applied to the at least one driveshaft;
   the vehicle further comprising a device configured to determine whether the vehicle should be driven according to the first mode or the second mode, based on an ambient parameter; the device being operative to determine whether the vehicle should be driven according to the first mode or the second mode when the vehicle is being driven in a situation where there is or will within a predetermined time be a reduced need for motive force for the vehicle.

* * * * *